US008911279B2

(12) United States Patent
Schneider et al.

(10) Patent No.: US 8,911,279 B2
(45) Date of Patent: Dec. 16, 2014

(54) TOY TRAILER

(75) Inventors: Frank Schneider, Neustadt (DE); Rainer Luther, Neustadt (DE)

(73) Assignee: Franz Schneider GmbH & Co. KG, Neustadt (DE)

( * ) Notice: Subject to any disclaimer, the term of this patent is extended or adjusted under 35 U.S.C. 154(b) by 398 days.

(21) Appl. No.: 13/359,915

(22) Filed: Jan. 27, 2012

(65) Prior Publication Data

US 2012/0196505 A1 Aug. 2, 2012

(30) Foreign Application Priority Data

Jan. 29, 2011 (DE) .......................... 10 2011 009 708

(51) Int. Cl.
*A63H 17/06* (2006.01)
*B62K 9/00* (2006.01)
(52) U.S. Cl.
CPC . *A63H 17/06* (2013.01); *B62K 9/00* (2013.01)
USPC ........................................................ 446/428
(58) Field of Classification Search
CPC ...... A63H 17/05; A63H 17/06; A63H 17/266
USPC .......................... 446/424, 427, 428, 434, 435
See application file for complete search history.

(56) References Cited

U.S. PATENT DOCUMENTS

| 1,602,424 | A | * | 10/1926 | Wood | 446/428 |
|---|---|---|---|---|---|
| 2,736,990 | A | * | 3/1956 | Howard | 446/428 |
| 2,870,566 | A | * | 1/1959 | Hofler | 446/94 |
| 3,145,056 | A | * | 8/1964 | Blahnik | 298/22 R |
| 3,462,879 | A | * | 8/1969 | Fahrendorff | 446/428 |
| 3,662,488 | A | * | 5/1972 | Linstead | 446/428 |
| 3,711,990 | A | * | 1/1973 | Pfeilsticker | 446/428 |
| 4,372,075 | A | * | 2/1983 | Harkins | 446/434 |
| 5,383,808 | A | * | 1/1995 | DuBois | 446/428 |
| 7,044,826 | B2 | * | 5/2006 | Edwards | 446/428 |
| 7,357,457 | B2 | * | 4/2008 | Thomas | 298/1 A |

* cited by examiner

*Primary Examiner* — Gene Kim
*Assistant Examiner* — Alyssa Hylinski
(74) *Attorney, Agent, or Firm* — Greer, Burns & Crain, Ltd.

(57) ABSTRACT

The toy trailer comprising a chassis and a loading trough arranged thereon is characterized in that the loading trough is both detachable from the chassis and tiltable about an axle extending in a direction transverse to the longitudinal axis of the chassis.

13 Claims, 18 Drawing Sheets

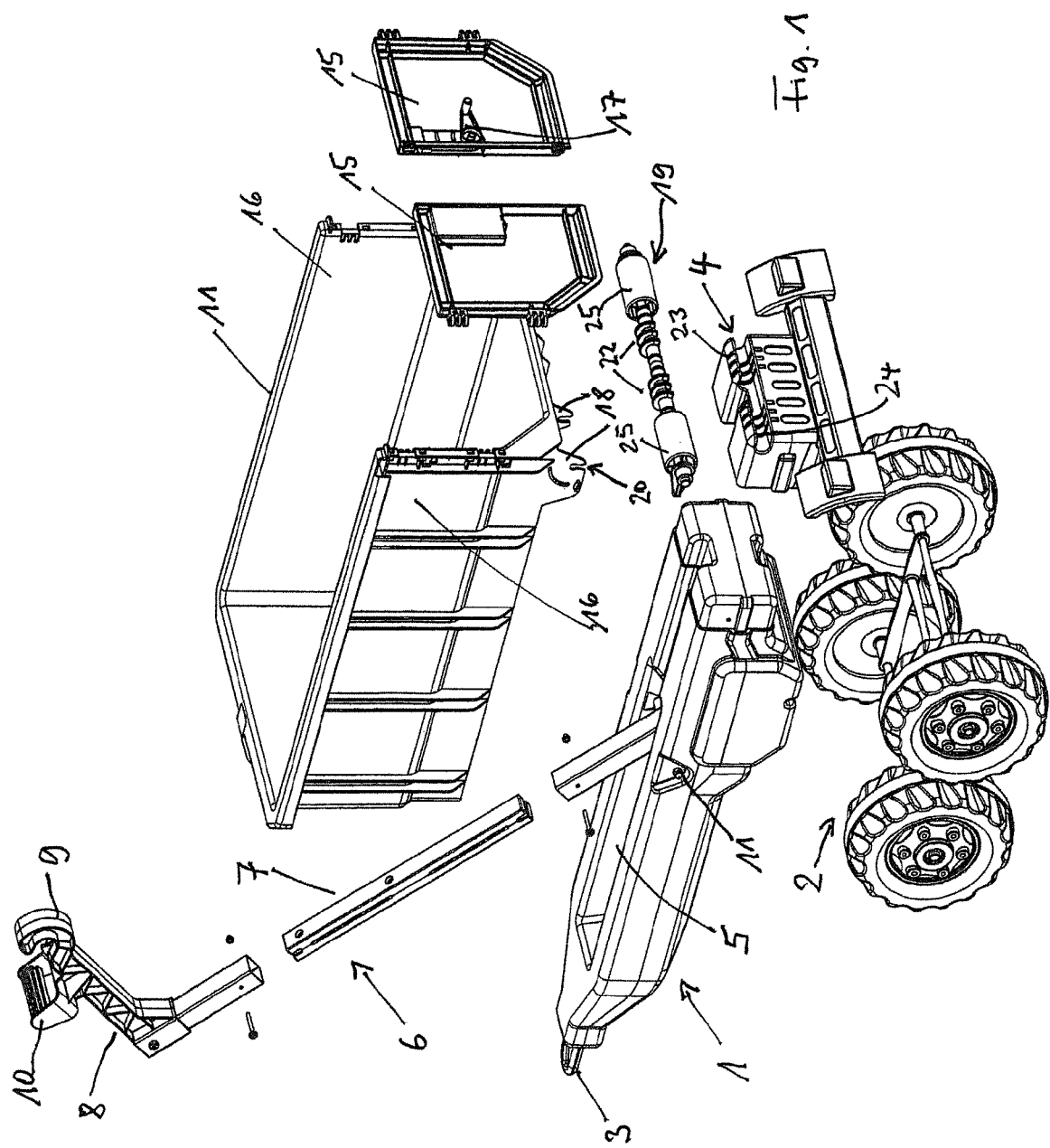

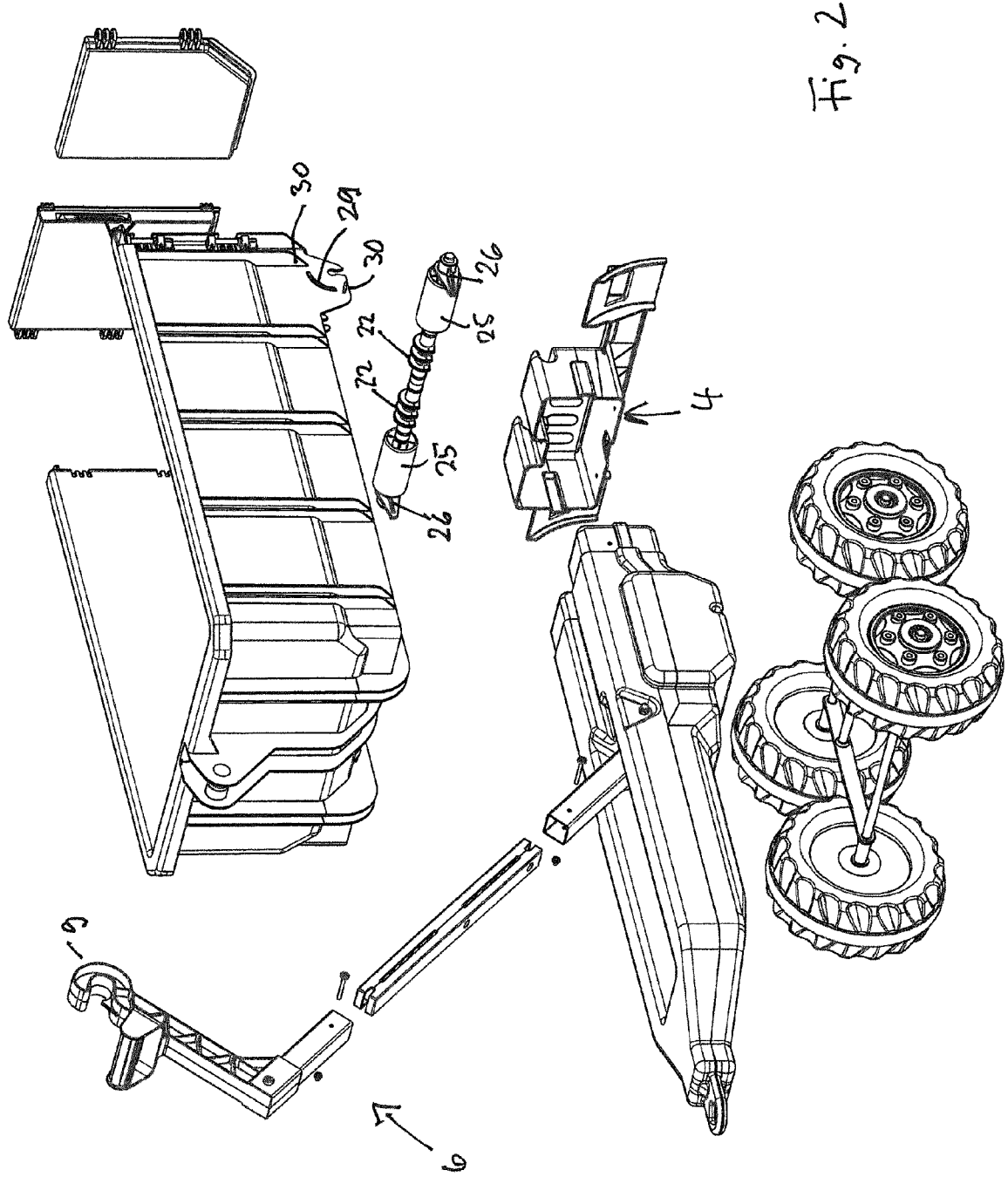

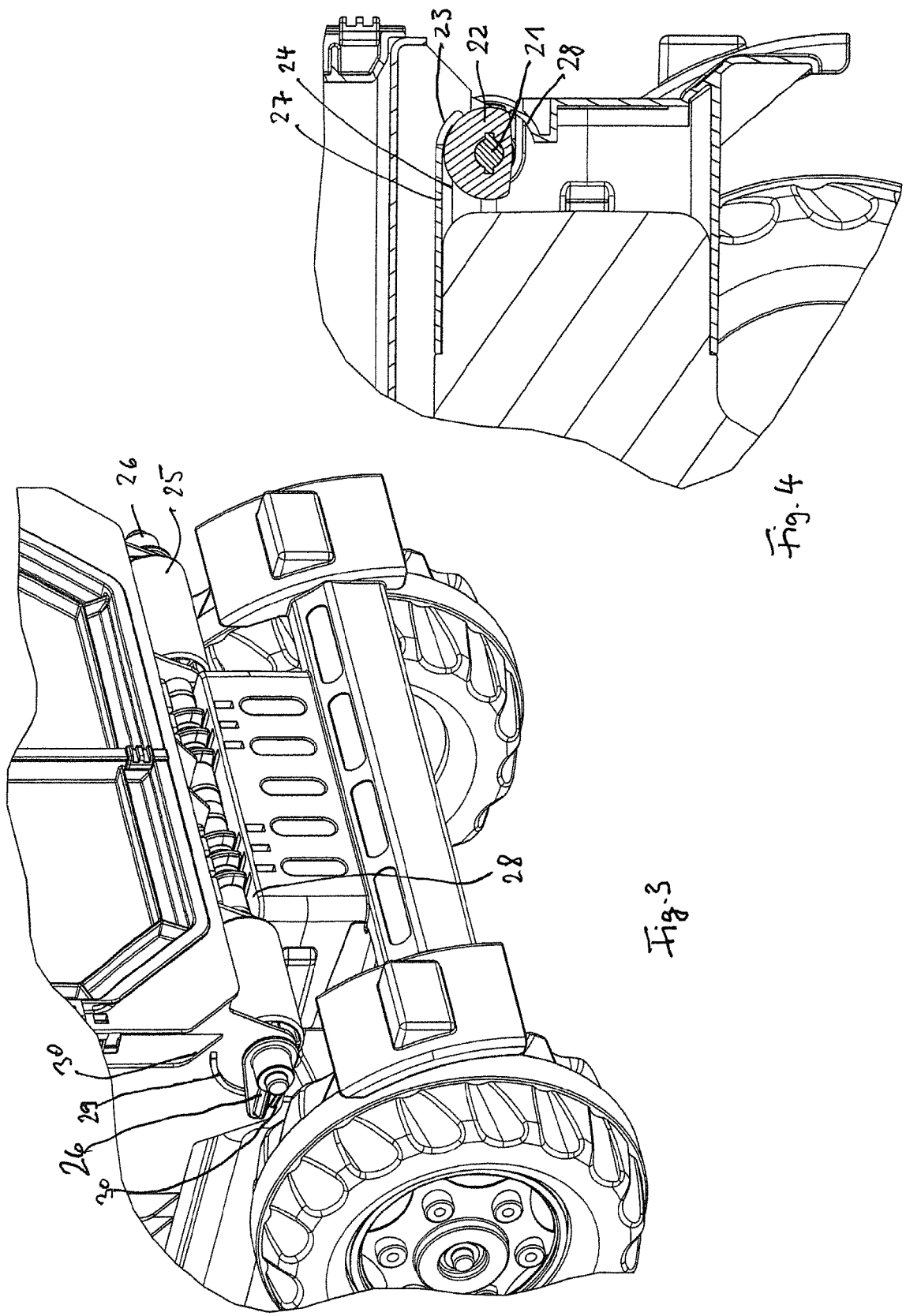

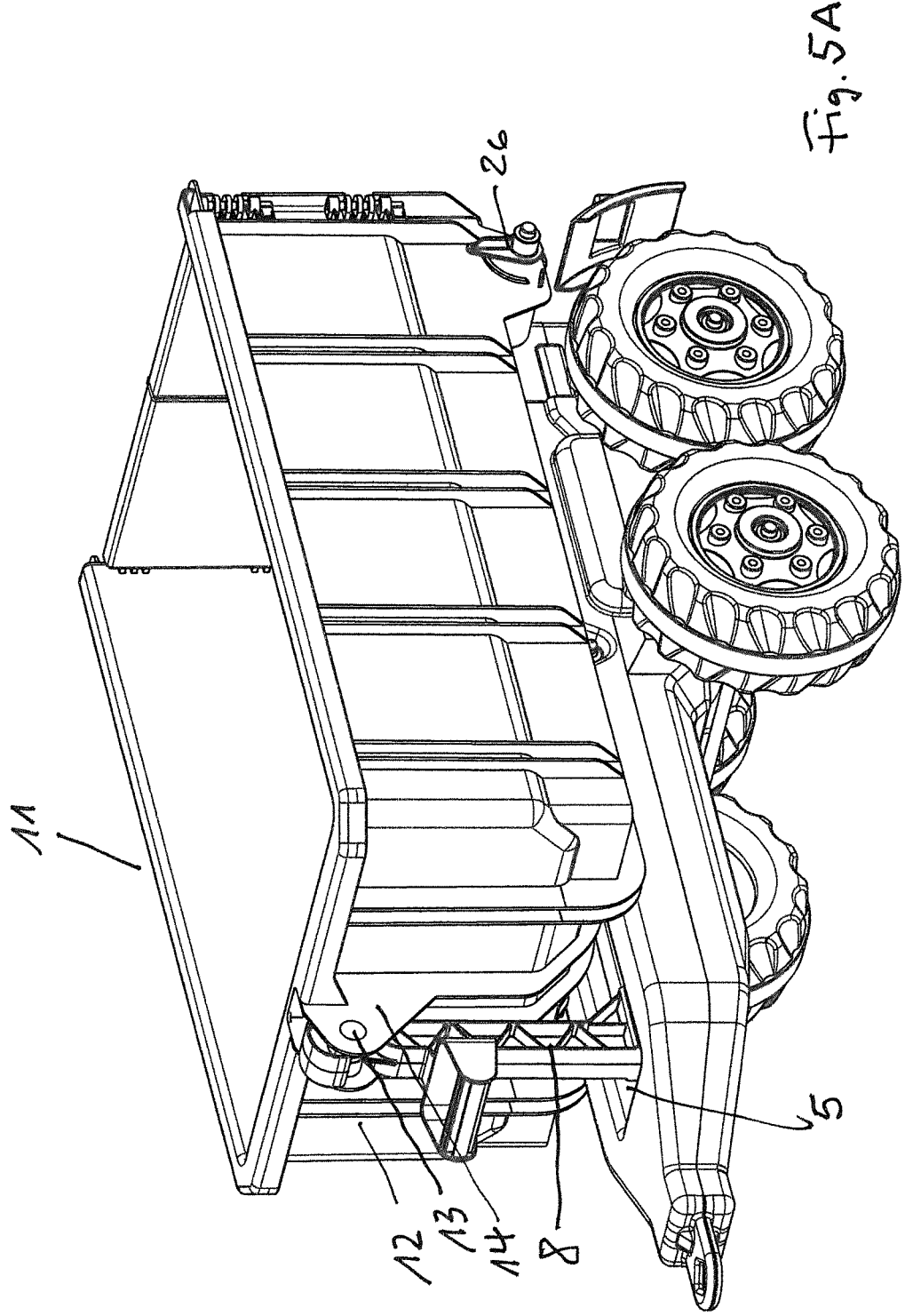

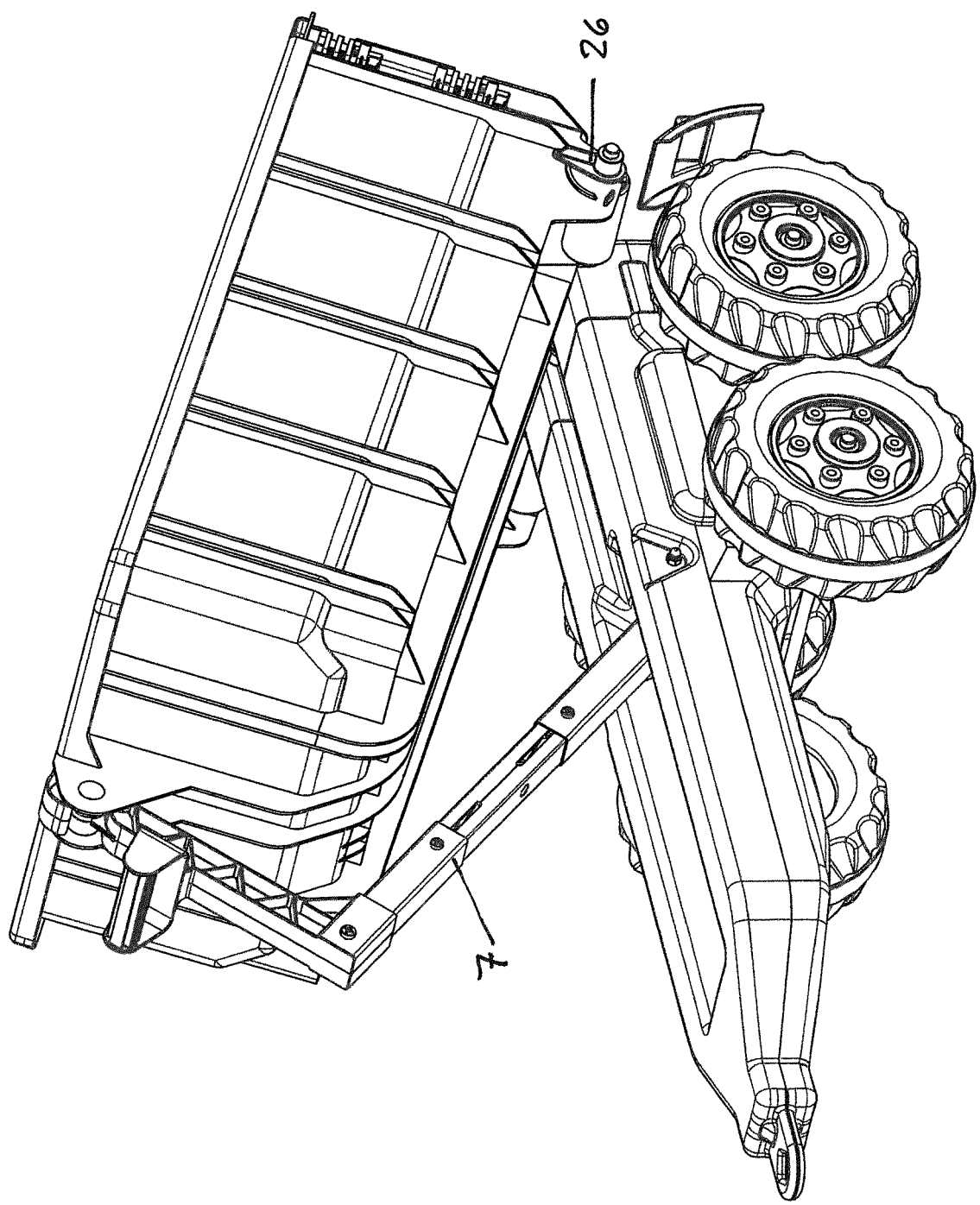

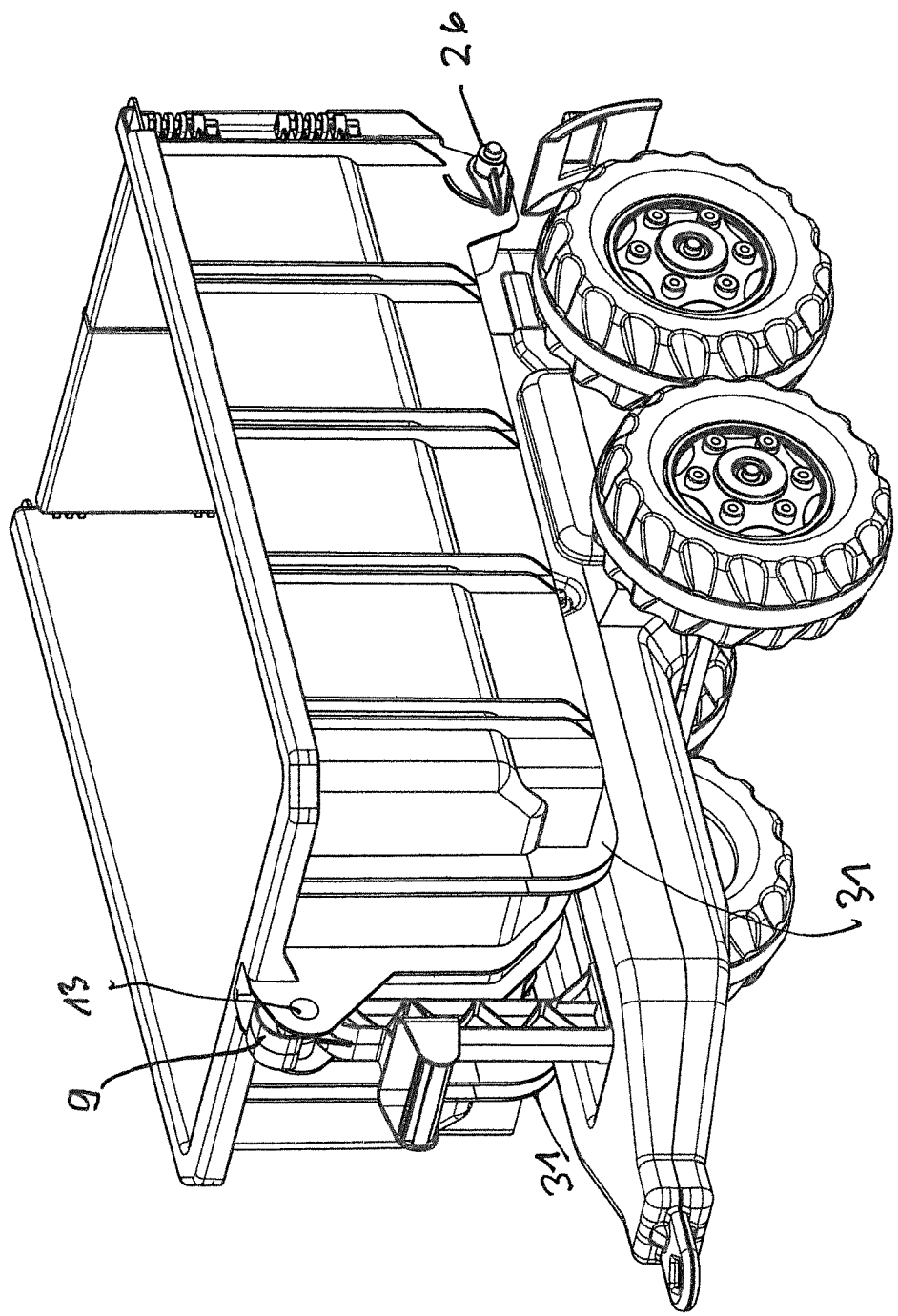

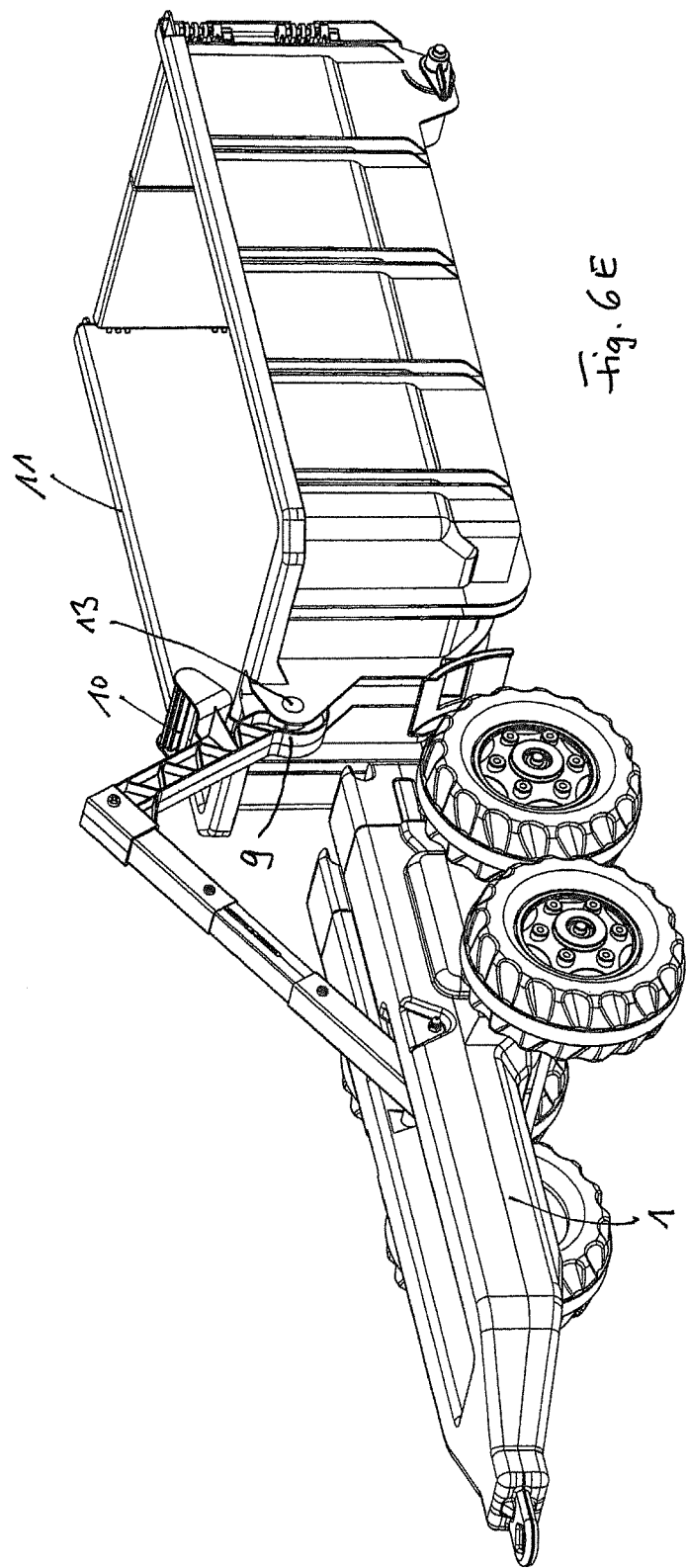

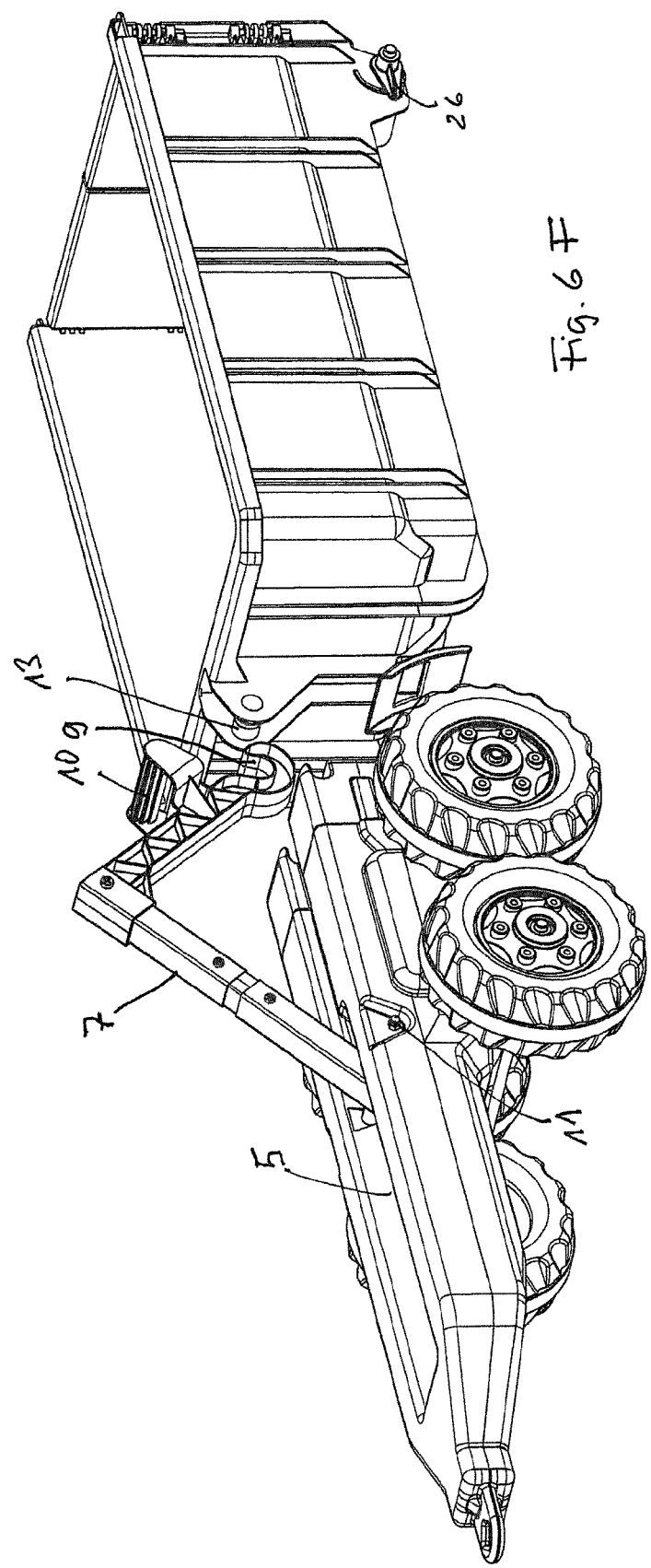

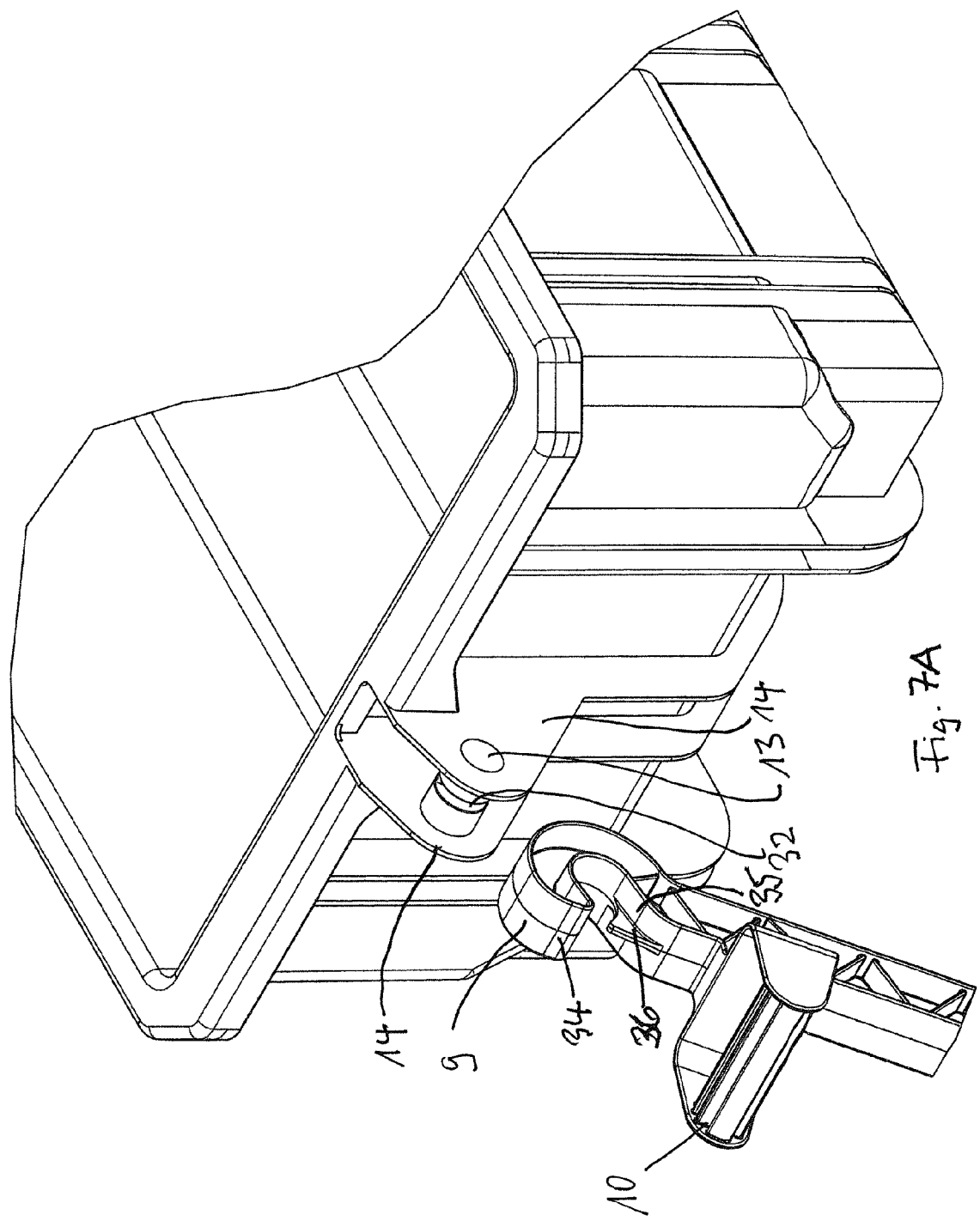

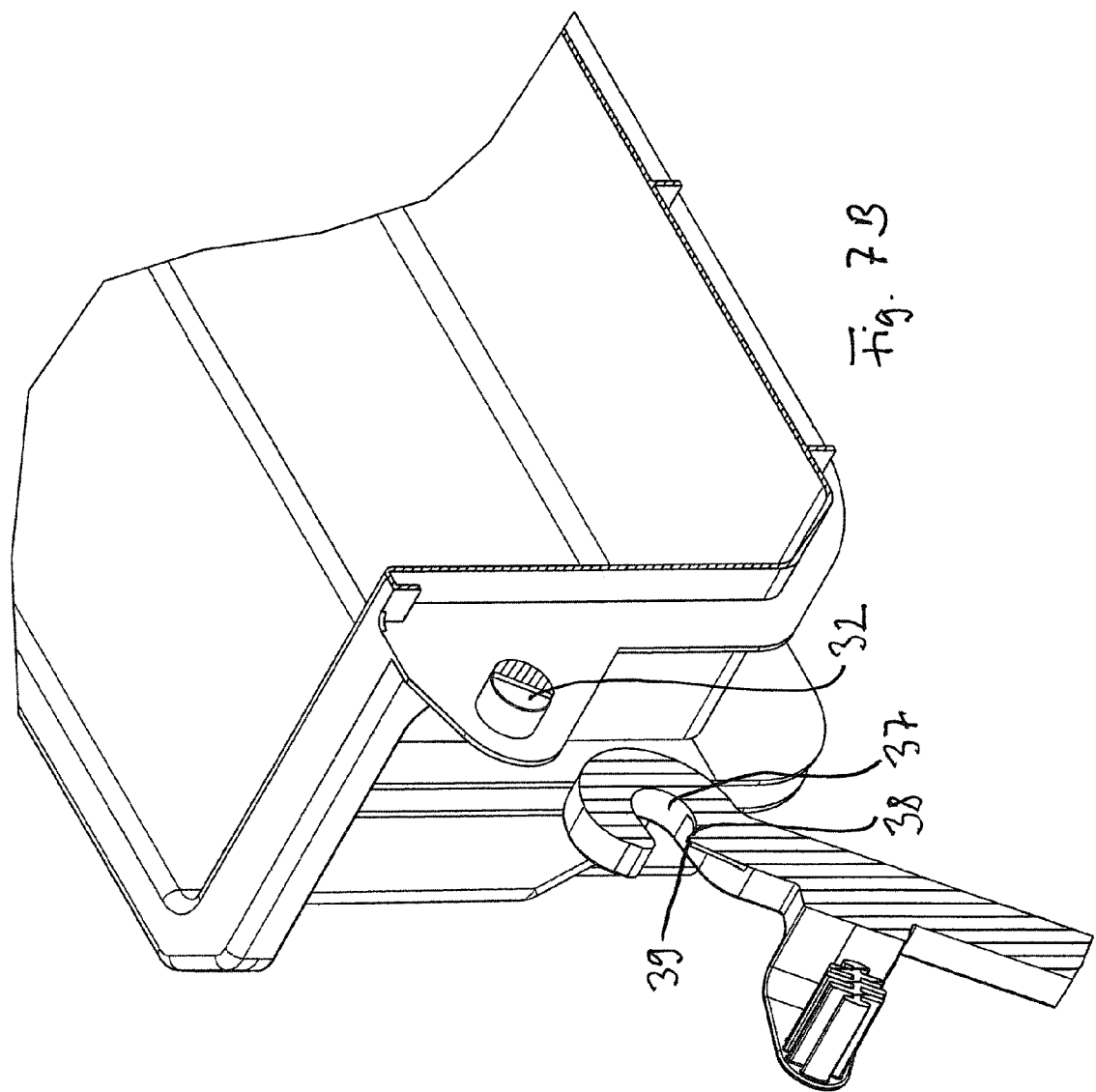

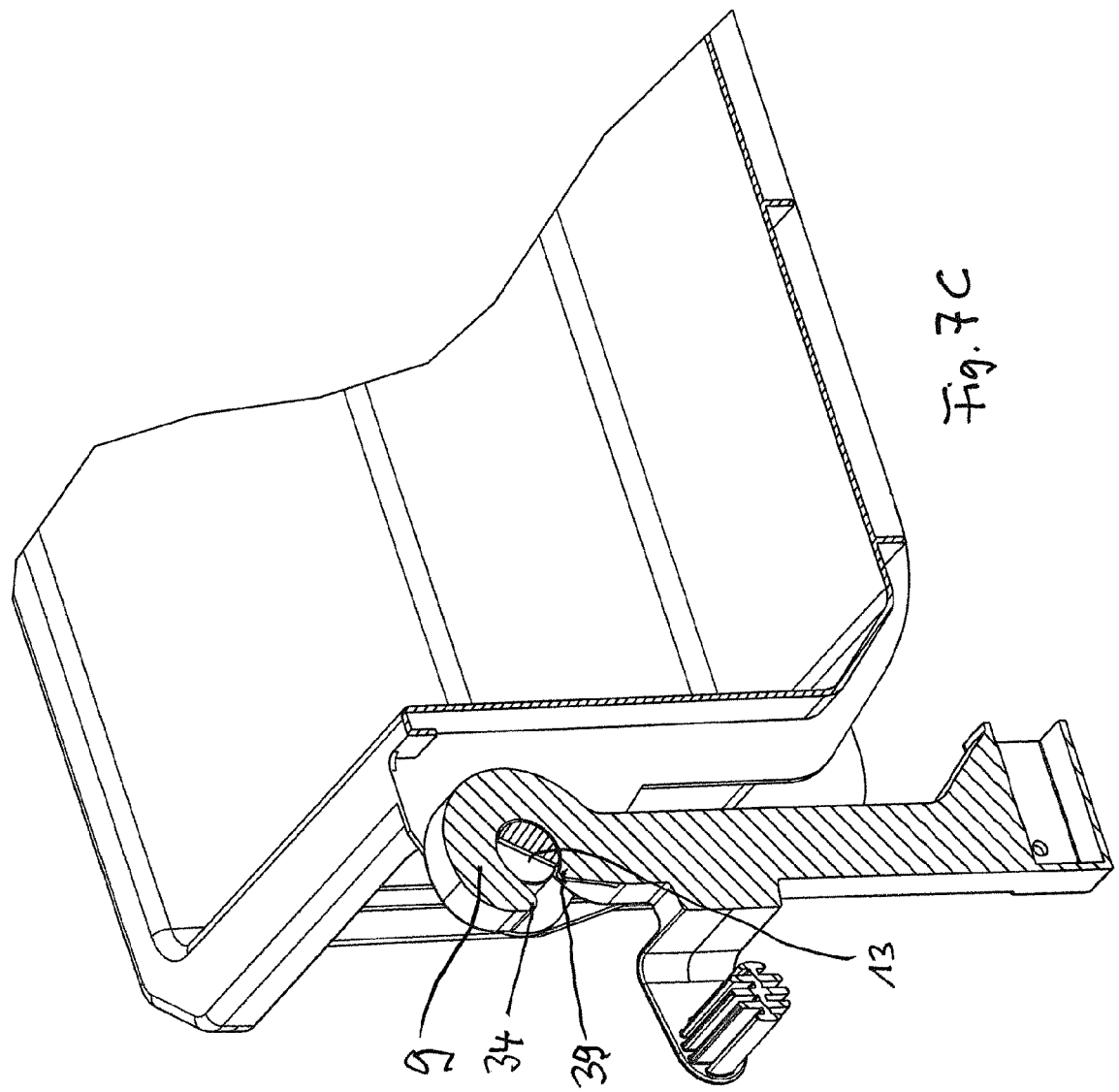

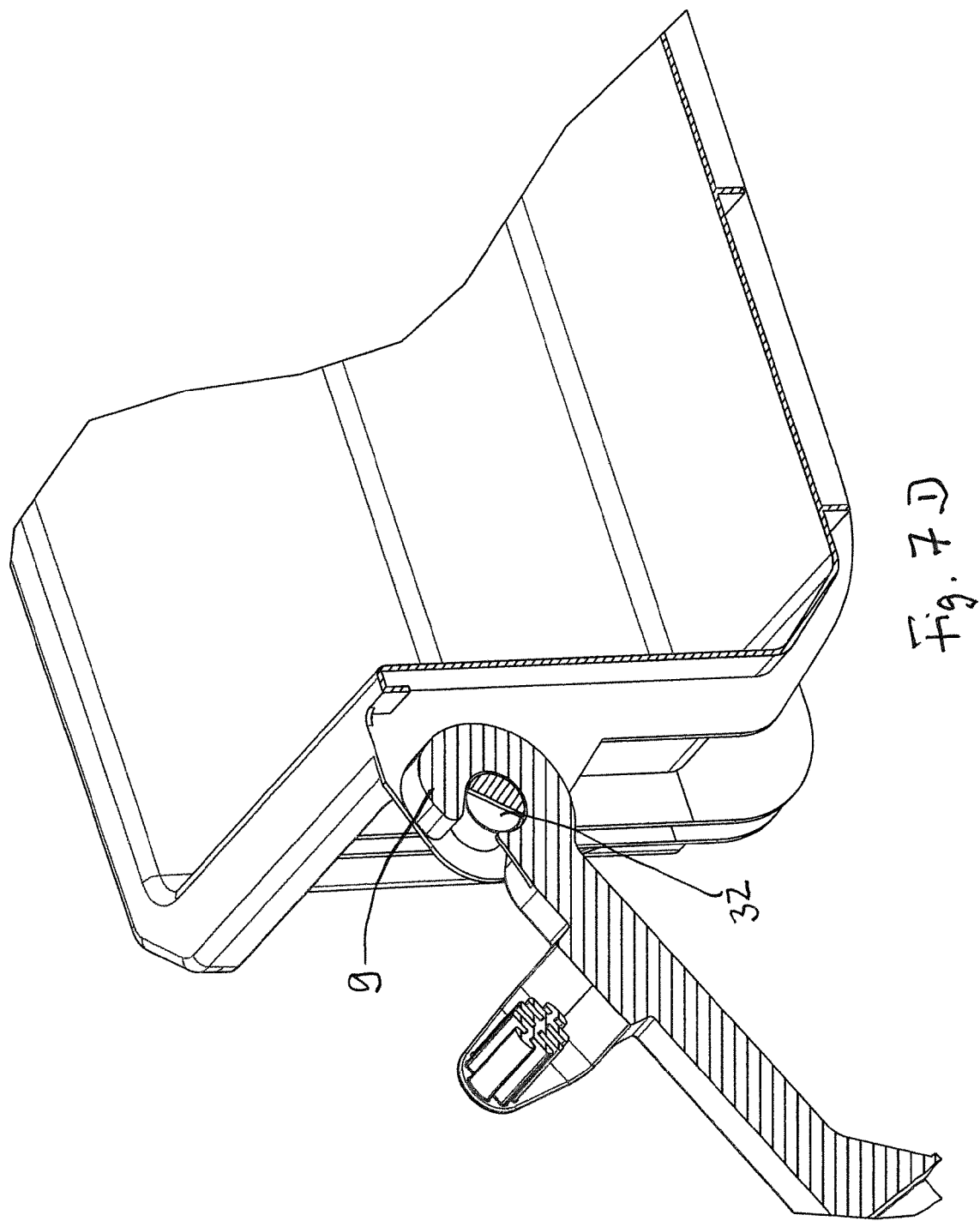

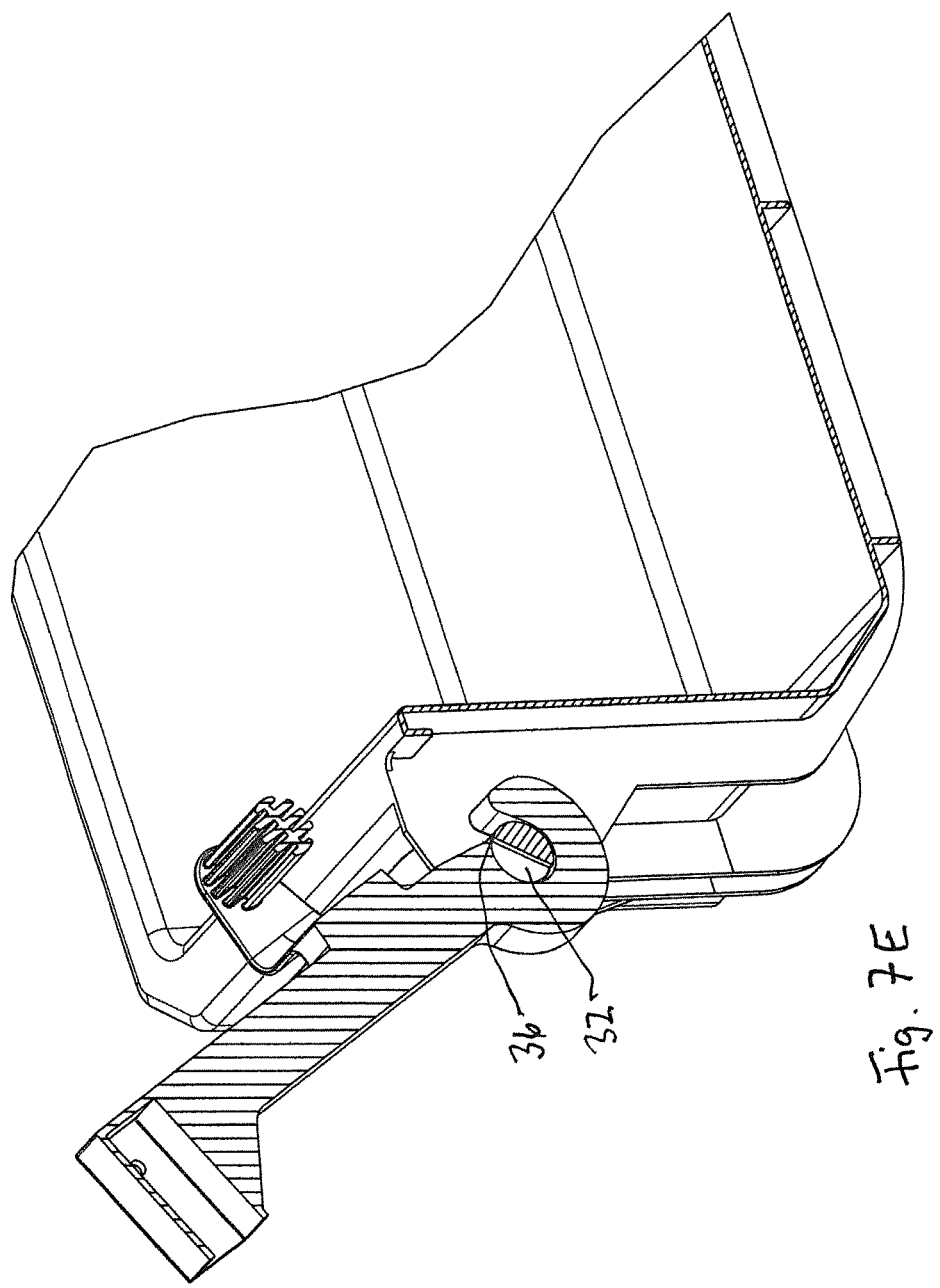

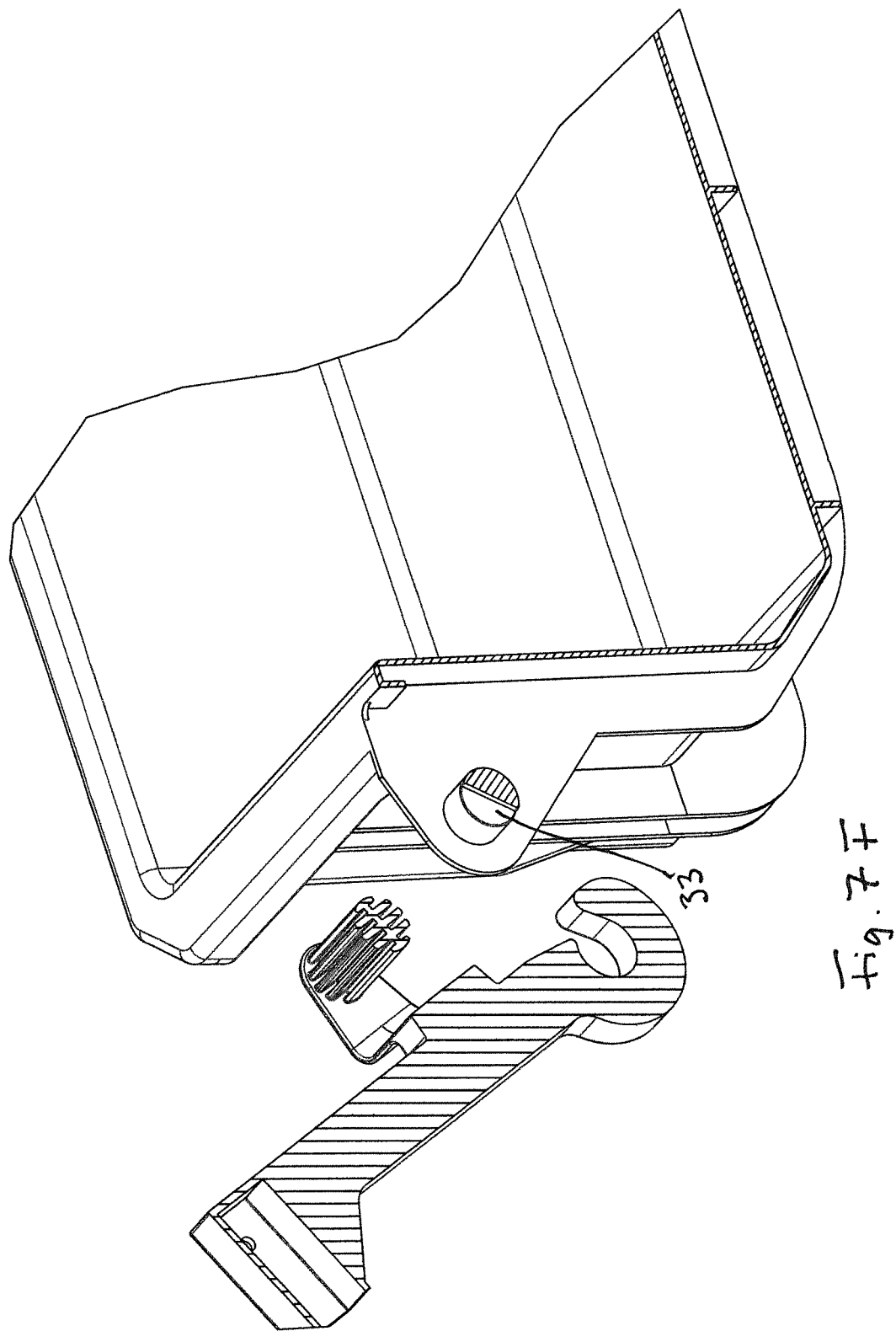

TOY TRAILER

FIELD OF THE INVENTION

The present invention relates to a toy trailer comprising a chassis and a loading trough arranged thereon. The toy trailer can e.g. be coupled with a pedal-driven children's vehicle in the form of a tractor. The playing person can e.g. drive the toy trailer to a place where said person loads the loading trough with sand or the like to transport the load to another place and to unload it at said place.

SUMMARY OF THE INVENTION

It is the object of the present invention to configure a toy trailer in such a manner that it has a high practical or playing value for the playing person.

This object is achieved according to the invention by a toy trailer comprising a chassis and a loading trough arranged thereon, wherein the loading trough is both detachable from the chassis and tiltable about an axle member extending in a direction transverse to the longitudinal axis of the chassis.

Advantageous embodiments of the invention are described below.

According to the invention the loading trough of the toy trailer can be selectively detached from the chassis or tilted in a direction transverse to the longitudinal axis of the chassis.

As a result, the playing child can deposit the loading trough at a place, load the trough e.g. with sand and then put it again on the chassis and move it to another place where the child pivots the loading trough about a tilt axis which is positioned on the rearward end of the chassis and extends in a direction transverse to the longitudinal axis of the chassis and the trough, in such a manner that the load is titled and discharged out of the rearward opening of the trough. To this end the loading trough may be provided with a rear pivotable gate or preferably with two gates that are arranged on the longitudinal sides of the loading trough and are pivotable about vertical axes.

The toy trailer according to the invention has many applications and, as a consequence, a high entertainment and play value for the child.

In an advantageous configuration of the invention the playing person performs the tilting operation and the deposition of the loading trough with the help of a hook arm which is pivotably fastened to the chassis. The arm which is provided with a hook has a long arm section which is extensible in the manner of a telescope and which extends in the initial position in the axial direction of the chassis and is articulated to the chassis at a distance from the rear end thereof, and an angled short section which in the initial position resting on the chassis centrally grips around the front face of the loading trough and is detachably fastened to the front end wall of the loading trough. To this end the hook grips in an advantageous configuration of the invention under a cross bolt which is spaced apart from the front end wall of the loading trough. Viewed in cross section, the hook preferably has about the shape of a semicircle the opening of which is oriented in the initial position of the hook arm away from the associated front side of the trough, i.e. it is directed forwards towards the towing vehicle.

In this connection it should be explained that "rearward" or "rear" stands for the side of the trailer facing away from the towing tractor.

The hook arm is fastened in a central opening or recess extending in the axial direction of the chassis and is countersunk in said opening/recess when the loading trough is positioned on the chassis. The short arm section which extends upwards at a right angle extends substantially in parallel with the front end wall of the loading trough and grips behind the cross bolt or similar fastening means.

Near the hook a forwardly oriented handle with which the playing person can lift the hook arm and thus the loading trough is mounted or formed on the short arm section. In this process the long arm section is extended in the manner of a telescope because the articulation point of the hook arm is positioned in front of the tilt axis of the loading trough, preferably approximately at half the axial length of the loading trough. The hook arm is preferably articulated by means of a bolt in the recess/opening of the chassis.

With the help of the hook arm the loading trough can be pivoted not only about its rear tilt axis, but also detached or deposited from the chassis, as has been explained further above. To this end a special axle member which is held or blocked in a rotational position with respect to the loading trough in a bearing block of the chassis and released in a second rotational position to exit rearwardly out of the bearing block is fastened to the underside of the rearward end of the loading trough. This axle member is snapped into projections slotted like a fork or a keyhole on the underside of the loading trough on the rear end thereof, namely such that the axle member remains rotatable in the snap type seat, but cannot fall out downwards out of the fastening position. The axle member has preferably a plurality of circular attachments positioned side by side, of which a corresponding circle segment is cut away. These preferably disc-shaped attachments are connected in a rotatably fixed manner to the real axle of the axle member.

A bearing block is fastened, preferably attached or screwed, to the rear end of the chassis, the bearing block comprising a transversely extending accommodating chamber for the central portion of the axle member on which the disc-shaped attachments are positioned, the accommodating chamber comprising a rearward exit opening from which the axle member can exit when it is in the second rotational position so as to detach and deposit the loading trough from the chassis. To this end the rearward exit opening has a height which is smaller than the diameter of the disc-shaped attachments and greater than the height of the attachments on the cut-away circle segments. Preferably, slots for accommodating the disc-shaped attachments are provided in the bearing block wall defining the accommodating chamber at the top, whereby the position of the axle member is defined relative to the bearing block. The slots are slightly broader than the thickness of the disc-shaped attachments.

As a rule, also a single broad attachment may be provided instead of a plurality of adjacent disc-shaped attachments.

The axle member is preferably provided on both lateral ends with handles that are connected in a rotatably fixed manner to the axle member. With these handles it is possible to adjust the two rotational positions of the axle member, said two rotational positions being defined by projections or elevations of the shape of a circular arc on associated wall sections of the loading trough, with the handles sliding over said projections or elevations when the rotational position of the axle member is to be adjusted. The handles lock in place behind the ends of the elevations of the shape of a circular arc and are arrested by stops on the associated wall sections of the trough against further rotation.

The two lateral end portions of the axle member have arranged thereon advantageously free-running rollers on which the loading trough is rolling when the axle member is in the release position and the loading trough is pivoted rearwards by means of the hook arm, thereby sliding from the chassis.

It is provided with advantage that two ribs that extend in axial direction and serve to guide the loading trough on the side edges of the chassis are mounted on the underside of the loading trough. It is thereby ensured that, when the loading trough is picked up by pivoting the hook arm back, the loading trough can again be accommodated in its exact orientation on the chassis, whereby the axle member enters again into the accommodating opening of the bearing block while being exactly centered by the disc-shaped attachments of the axle member and the associated slots on the edge of the exit opening of the bearing block. In this position the loading trough is locked on the chassis in that the axle member is moved into the first rotational position.

BRIEF DESCRIPTION OF THE DRAWINGS

Further details of the invention become apparent from the following description of a preferred embodiment and on the basis of the drawing, in which:

FIGS. 1 and 2 are exploded views of the trailer in different perspectives;

FIG. 3 shows the rearward end section of the trailer on an enlarged scale;

FIG. 4 is a vertical section through the portion of FIG. 3;

FIGS. 5A to 5C show successive states of the trailer during tilting of the loading trough;

FIGS. 7A to 7F show a preferred embodiment of a self-locking of the hook arm with the loading trough in different representations for illustrating the functional principle.

DESCRIPTION OF THE PREFERRED EMBODIMENTS

Figure 5B:
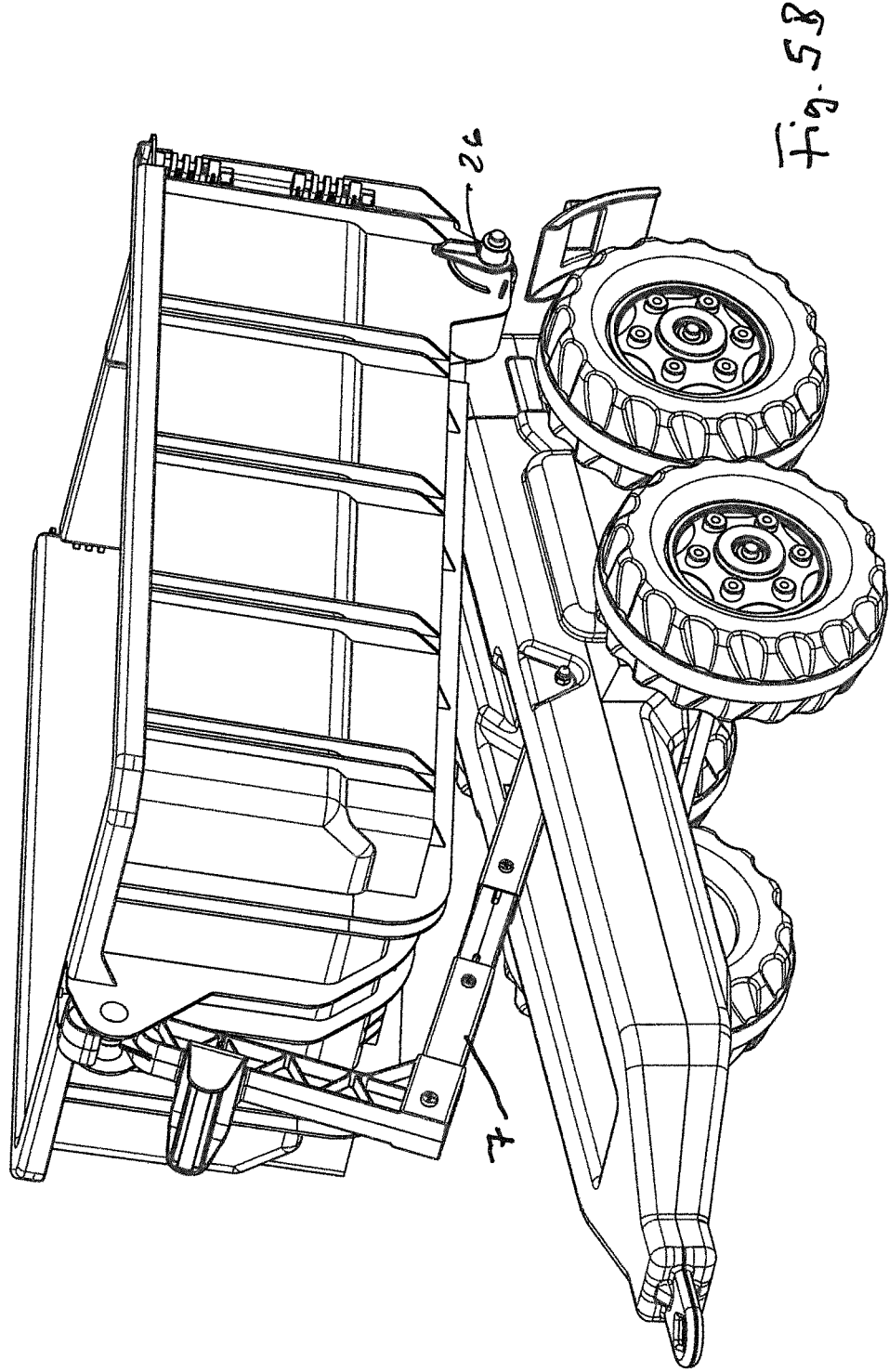

Reference is first of all made to FIGS. 1 and 2. The trailer includes a chassis 1 which is provided with four wheels 2. The chassis 1 is provided on its front end with a coupling member 3 with which the chassis 1 can e.g. be fastened to a pedal-driven toy tractor. A bearing block 4 is mounted on the rear end of the chassis 1 and fastened by means of screws. The chassis 1 and the bearing block 4 are made of plastics.

The chassis 1 comprises an opening or recess 5 which centrally extends in axial direction and in which approximately at half the length of the axial extension of the trailer a hook arm, designated by reference numeral 6 on the whole, is hinged. The hook arm contains a long arm section 7 which is composed of three pieces and which is extended or shortened in the manner of a telescope when the hook arm 6 is pivoted, and a short arm section 8 which is attached at a right angle and is provided on its free end with a hook 9. When viewed from the side, the hook 9 has substantially a semicircular shape with an opening that is directed forwards, i.e. towards the towing vehicle. At a distance from the hook 9 the short arm section 8 is provided with a handle 10.

Figure 6:
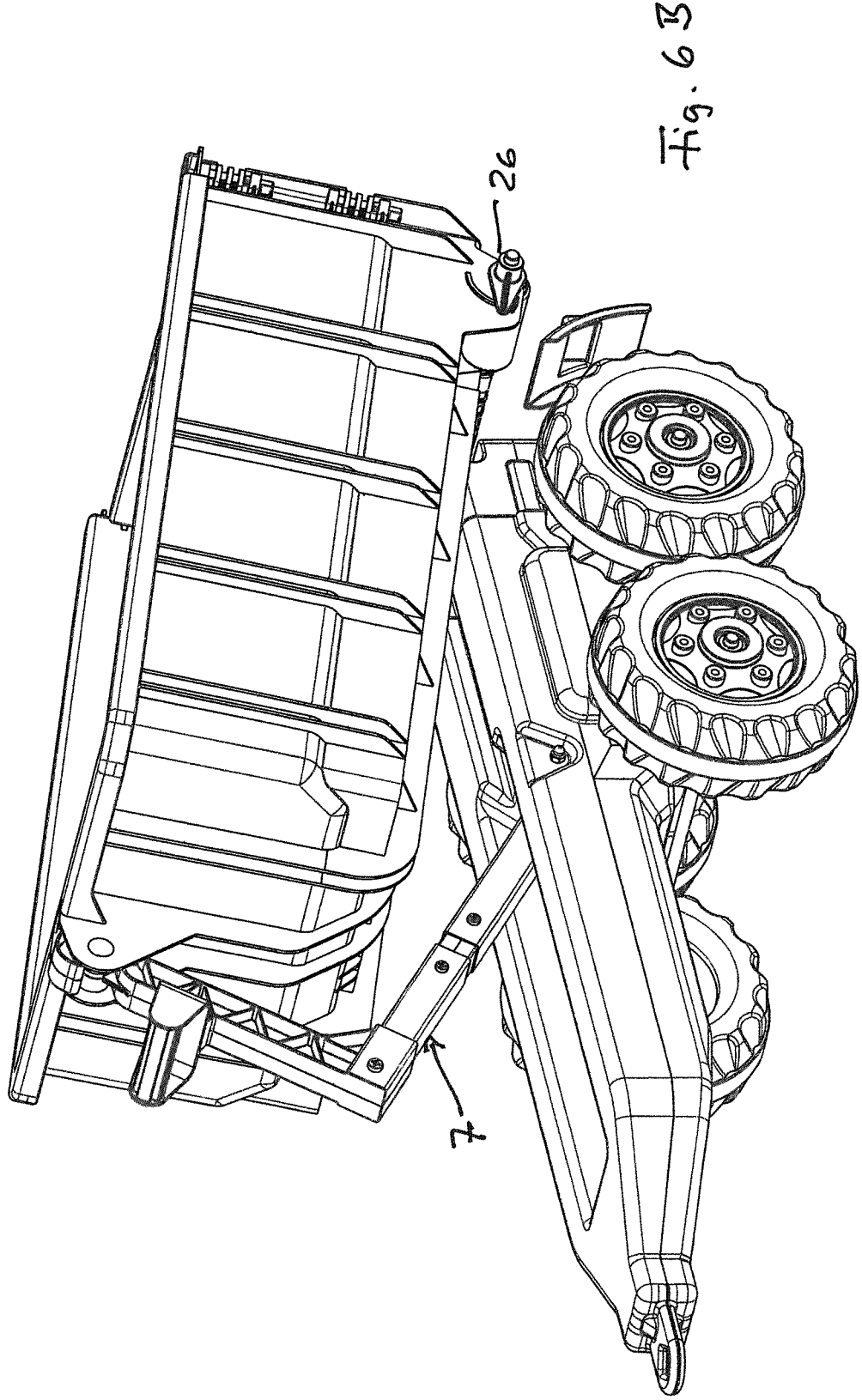
FIGS. 6A to 6F show successive states during deposition of the loading trough.
Figure 6C:
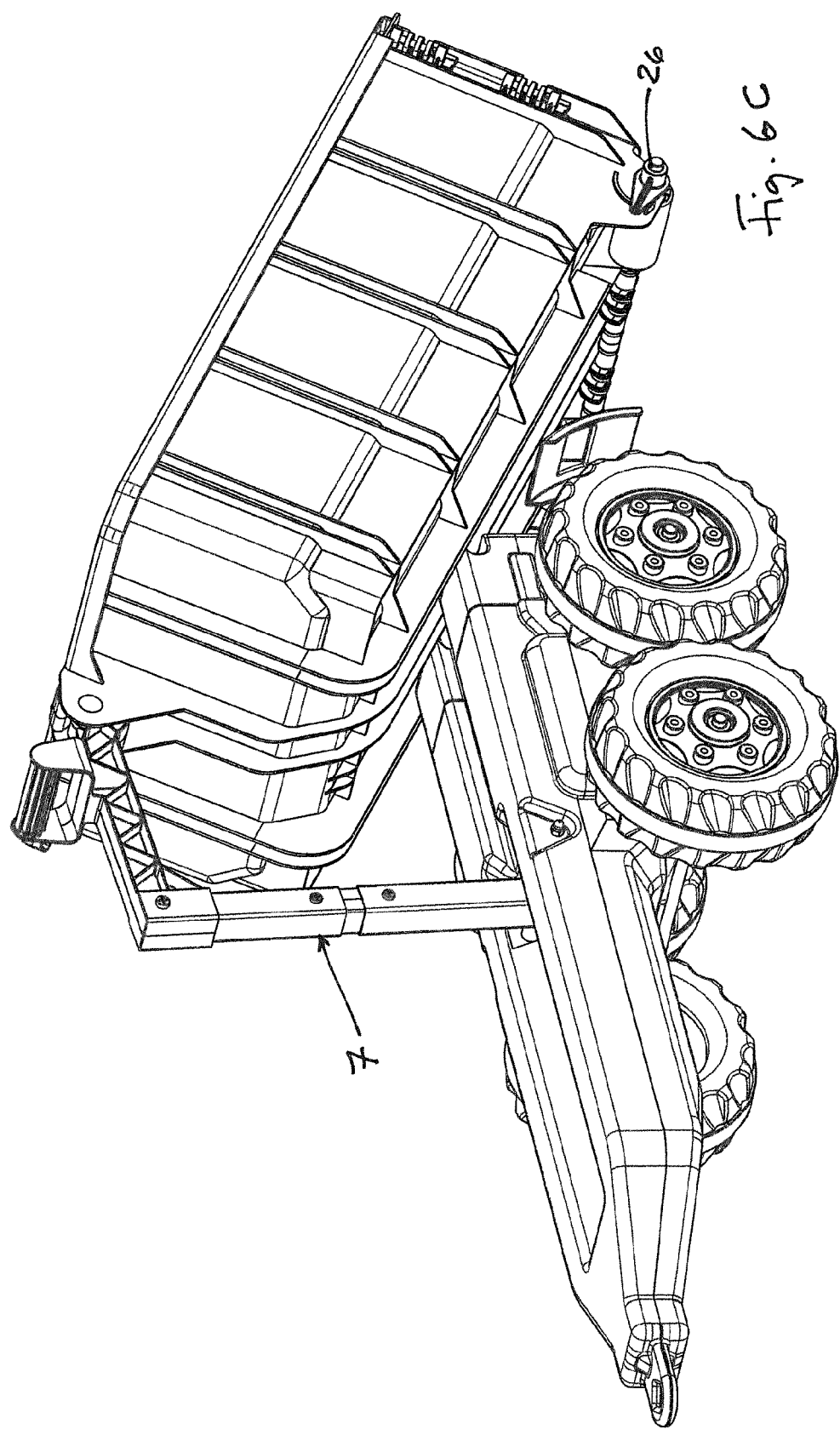
Figure 6D:
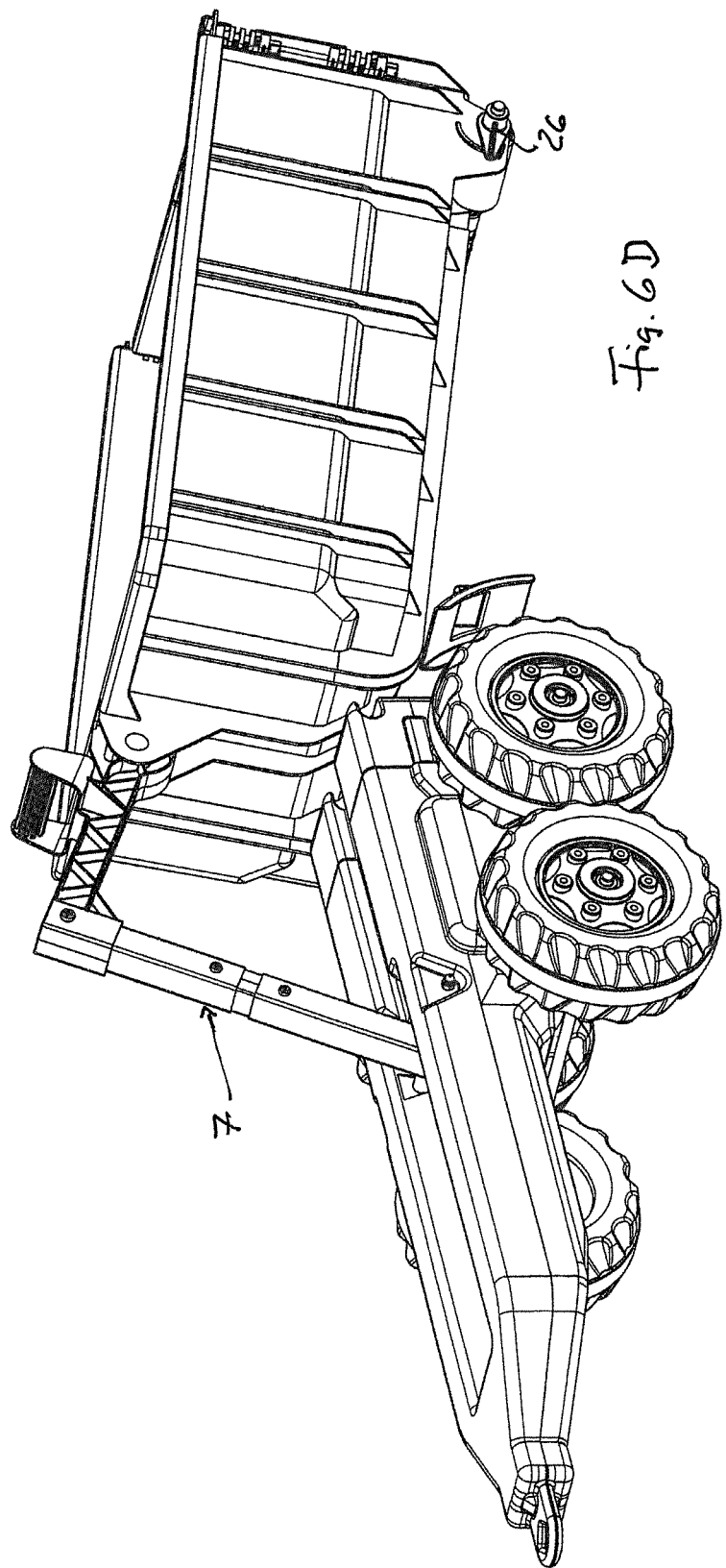

The arm section 7 which can be extended in the manner of a telescope is pivotably supported within the recess or opening 5 by means of a bolt 11 in such a manner that it is pivotable out of a forwardly directed position countersunk in the recess or opening into an obliquely rearwardly directed position, which is e.g. shown in FIG. 6 F.

On the chassis 1, a loading trough 11 is positioned on the chassis 1 in the initial position shown in FIGS. 5A and 6A, with the long arm section 7 being countersunk in the central recess or opening 5 and the short arm section 8 gripping around the front end wall 12 of the loading trough 11. In this position the hook 9 grips behind a bolt 13 which is spaced apart from the end wall 12 and which is held by projecting reinforcement ribs 14 of the loading trough 11. The loading trough is preferably made of plastics.

The rear end wall of the loading trough 11 is formed by two gates 15 that are hinged to the two side walls 16 of the loading trough 11 and are lockable via a handle 17.

Projections 18 project downwards from the rearward end of the loading trough 11 on the underside of its bottom; starting from the lower edge, the projections have slotted openings in which an axle member 19 is locked in place. To this end the axle member 19 is pressed at the associated places through constrictions of the slots 20. In the end position the axle member 19 is rotatably held in the attachments 18, but cannot fall downwards out of said attachments.

Disc-shaped elements 22 which are connected to the axle 21 in a rotatably fixed manner are seated on the real axle 21 of the axle member 19, as shown in FIG. 4. Three of such elements 22 are here respectively provided on the axle and have positions conforming to those of the slots 23 in the bearing block 4 when the axle member 19 is fastened to the bearing block 4.

The disc-shaped elements 22 have a circular shape with a cut-away circle segment. The bearing block 4 comprises an accommodating opening 24 in which the central portion of the axle member 19 with the disc-shaped elements 22 can be accommodated.

At the right and left side of the disc-shaped elements 22 a roller 25 is respectively seated to be freely rotatable on the axle 21, which is moreover connected in a rotatably fixed manner to a handle 26 at both lateral ends.

With the help of the handles 26 the axle member 19 is rotatable and adjustable, respectively, on the chassis 1 and in the accommodating opening 24, respectively, between the position shown e.g. in FIG. 5A, in which the axle member 19 is blocked or held in the accommodating opening 24, and the position shown in FIG. 6A, in which the axle member 19 can exit out of the accommodating opening 24, whereby the loading trough 11 can be separated from the chassis.

The release position of the axle member 19 can best be seen in FIGS. 3 and 4. The upper wall 27 which defines the accommodating opening 24 contains slots 23 continuously extending up to the edge. The accommodating opening 24 is defined at the bottom by a continuous wall 28 which is without such slots. When the axle member 19 is rotated with the help of the handles 26 into the release position shown in FIGS. 3 and 4, the disc-shaped attachments 22 can exit over the edge of the wall section 28 and through the slots 23 of the upper wall 27 out of the accommodating opening 24.

When the handles 26 are however in a state where they are pivoted upwards by about 90°, the wall section 28 of the accommodating opening 24 blocks the exit of the axle member 19.

When the handles 26 are displaced from the one position into the other position, the handles 26 are each sliding over projections 29, which have the shape of a circular arc and extend over an arc of about 90°, and are locked in place behind them. Stops 30 prevent a further rotation of the handles 26.

The loading trough 11 is tilted by the playing person with the help of the hook arm 6 either around the rearward axle 19 and 21, respectively, or is deposited behind the chassis 1. To this end the playing person grips the handle 10 and pivots the loading trough 11 about the rearward axle 19 and 21, respectively, when the axle member 19 is rotated into the locking position shown in FIGS. 5A to 5C. In the opened state of the tailgates 15 e.g. a load of sand can thereby be discharged by tilting. Thereafter the loading trough 11 can again be pivoted back into the initial position shown in FIG. 5 A.

When the axle member 19 is rotated into the position shown in FIGS. 6 A to 6 F, in which the loading trough 11 can be separated from the chassis 1, the loading trough 1 will slide over the bearing block 4 of the chassis 1 to the rearward side of the chassis, with the loading trough 11 being guided by two ribs 31, which extend in axial direction, on its underside along the side edges of the chassis. When the loading trough according to FIG. 6 E has been deposited on the ground behind the chassis, the hook 9 will detach from the bolt 13 on the front end wall of the loading trough 11 when the hook arm 6 is pressed by means of the handle piece 10 a little bit further downwards, so that the loading trough 11 is fully separated from the chassis 1, as shown in FIG. 6 F.

FIGS. 7 A to 7F are perspective views, partly cut, which show a preferred locking mechanism between the hook 9 and the bolt 13, which so to speak forms an "eyelet" together with the wall sections 14 holding the same.

FIGS. 7A and 7B show the hook 9 and the "eyelet" 13, 14 in a separated arrangement. The bolt 13 centrally contains a groove 32 in the area of which about half the cross section of the bolt 13 is cut away, the groove bottom extending obliquely forwards when viewed from the top to the bottom. Cut away is the front half 33 of the bolt cross-section in the area of the groove. The bolt is held in a rotatably fixed manner by the wall sections 14.

The hook 9 has a width that is slightly smaller than the clearance between the side walls 14, so that the hook 9 can pass for engagement behind the bolt 13 between the wall sections 14. This is however only possible in the position of the hook 9 that is shown in FIGS. 7E and 7F.

The hook 9 is approximately U-shaped and its accommodating opening for the bolt 13 is circularly rounded, wherein the distance between its free outer edge 34 and the opposite hook section 35 ending in a flat curvature is slightly greater than the thickness of the full cross-section of the bolt 13. A small projection 36 which while facing the interior 37 of the hook 9 has an arcuate edge contour 38 projects centrally from the hook section 35. The width of the strip-like projection 36 is slightly smaller than the width of the groove 32, so that the projection 36 can enter into the groove 32 in a corresponding position of the hook 9.

The clearance between the head end 39 of the projection 36 and the opposite outer edge 34 of the hook 9 is smaller than the diameter of the bolt 13 and slightly greater than the remaining width of the bolt 13 in the area of the groove 32. This has the consequence that the hook 9 in the initial position of the hook arm as shown in FIG. 7C and also during the pivotal movement into the position shown in FIG. 7D is not separable from the eyelet. When the hook arm has been further pivoted into the deposited position of the trough 11 (FIG. 7E), it can be moved back such that the projection 36 of the hook 9 slides through the groove 32, with the bolt 13 exiting in relative terms out of the accommodating chamber of the hook 9. This state is shown in FIG. 7F.

What is claimed is:

1. A toy trailer comprising a chassis having a longitudinal axis and a loading trough arranged thereon, the loading trough is both detachable from the chassis and tiltable about an axle member extending in a direction transverse to the longitudinal axis of the chassis, the axle member being fastened to an underside of a rearward end of the loading trough and is held in a first rotational position in a bearing block of the chassis and is released in a second rotational position to exit rearwards out of the bearing block, wherein the axle member has at least one circular attachments from which a corresponding circle segment is cut away, and the bearing block comprises an accommodating chamber for a central portion of the axle member containing the attachment, with a rearward exit opening having a height which is smaller than a diameter of the attachment and greater than a height of the cut-away circle segment of the attachment.

2. A to trailer comprising a chassis having a longitudinal axis and a loading trough arranged thereon, the loading trough is both detachable from the chassis and tiltable about an axle member extending in a direction transverse to the longitudinal axis of the chassis the axle member being fastened to an underside of a rearward end of the loading trough and is held in a first rotational position in a bearing block of the chassis and is released in a second rotational position to exit rearwards out of the bearing block, wherein handles are mounted on lateral ends of the axle member for adjusting the two rotational positions of the axle member, and the two rotational positions are defined by projections in the shape of a circular arc on wall sections of the loading trough, over which the handles slide and wherein the handles lock in place at the respective ends of the circular arc shaped projections.

3. The toy trailer according to claim 1, wherein free-running rollers are arranged on the axle member.

4. The toy trailer according to claim 1, wherein the chassis has fastened thereto an arm which is provided with a hook and which comprises a long arm section which is extensible in the manner of a telescope and which is articulated to the chassis at a distance from a rear end of the chassis, and an angled short arm section on a free end of which the hook is mounted that can grip under a cross bolt on a front end wall of the loading trough.

5. The toy trailer according to claim 4, wherein the arm is articulated in a central opening or recess of the chassis and the long arm section thereof is countersunk in the opening or recess when the loading trough is positioned on the chassis.

6. The toy trailer according to claim 5, wherein a handle is mounted on the arm near the hook.

7. The toy trailer according to claim 1, wherein an underside of the loading trough has mounted thereon two ribs that extend in an axial direction and serve to guide the loading trough on side edges of the chassis.

8. The toy trailer according to claim 1, wherein at least one pivotable gate is arranged on a rear side of the loading trough.

9. The toy trailer according to claim 4, wherein the hook comprises a projection which projects into a cavity thereof and which cooperates with a central groove of the cross bolt in such a manner that the hook is only separable from the trough in a deposition position of the hook.

10. The toy trailer according to claim 1, wherein handles are mounted on lateral ends of the axle member for adjusting the two rotational positions of the axle member, and the two rotational positions are defined by projections in the shape of a circular arc on wall sections of the loading trough, over which the handles slide and wherein the handles lock in place at respective ends of the circular arc shaped projections.

11. The toy trailer according to claim 2, wherein free-running rollers are arranged on the axle member.

12. The toy trailer according to claim 1, wherein the axle member has a plurality of circular attachments.

13. The toy trailer according to claim 8 wherein two pivotable gates are arranged on the rear side of the loading trough.

* * * * *